US011061949B2

(12) United States Patent
Lloyd et al.

(10) Patent No.: US 11,061,949 B2
(45) Date of Patent: Jul. 13, 2021

(54) USER INTERFACE FOR CONTEXTUAL SEARCH

(71) Applicant: ServiceNow, Inc., Santa Clara, CA (US)

(72) Inventors: Matthew David Lloyd, Santa Clara, CA (US); Antin Brucelee Selvaraj, Santa Clara, CA (US); Lifen Yan, Santa Clara, CA (US); Keying Li, Sunnyvale, CA (US); Sravani Boggarapu, Milpitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 349 days.

(21) Appl. No.: 16/122,426

(22) Filed: Sep. 5, 2018

(65) Prior Publication Data

US 2020/0074001 A1    Mar. 5, 2020

(51) Int. Cl.
*G06F 16/338*    (2019.01)
*G06F 16/9535*    (2019.01)
*H04L 12/24*    (2006.01)

(52) U.S. Cl.
CPC ........ *G06F 16/338* (2019.01); *G06F 16/9535* (2019.01); *H04L 41/0853* (2013.01); *H04L 41/22* (2013.01)

(58) Field of Classification Search
None
See application file for complete search history.

(56) References Cited

U.S. PATENT DOCUMENTS

| | | |
|---|---|---|
| 6,609,122 B1 | 8/2003 | Ensor |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |

(Continued)

*Primary Examiner* — Robert W Beausoliel, Jr.
*Assistant Examiner* — Cheryl M Shechtman
(74) *Attorney, Agent, or Firm* — Fletcher Yoder PC

(57) ABSTRACT

A system may include a database and server device(s), where the database contains incident record(s) that include information about reported issues, as well as information resource(s) related to the issue(s) and organized into categories, and where the server device(s): provide a graphical user interface (GUI) that comprises (i) a first pane including information from a particular incident record and (ii) a second pane including a search field and a menu enabling selection from the categories; receive a keyword entered in the search field and a selection of categories from the menu; provide an updated representation of the GUI in which the second pane shows search results based on the keyword and including information resource(s) from selected categories, where the information resource(s) are respectively associated with controls; and, responsive to activation of a control, store a link between the particular incident record and the information resource associated with this control.

20 Claims, 12 Drawing Sheets

(56) References Cited

U.S. PATENT DOCUMENTS

| | | |
|---|---|---|
| 7,945,860 B2 | 5/2011 | Vampenepe |
| 7,966,398 B2 | 6/2011 | Wiles |
| 8,051,164 B2 | 11/2011 | Peuter |
| 8,224,683 B2 * | 7/2012 | Manos ........... G06Q 10/063114 |
| | | 705/7.15 |
| 8,266,096 B2 | 9/2012 | Navarrete |
| 8,457,928 B2 | 6/2013 | Dang |
| 8,478,569 B2 | 7/2013 | Scarpelli |
| 8,549,028 B1 * | 10/2013 | Alon .................... G06F 16/245 |
| | | 707/769 |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 8,903,813 B2 | 12/2014 | Friedlander |
| 9,239,857 B2 | 1/2016 | Trinon |
| 9,535,737 B2 | 1/2017 | Joy |
| 9,557,969 B2 | 1/2017 | Sharma |
| 9,792,387 B2 | 10/2017 | George |
| 2003/0016238 A1 | 1/2003 | Sullivan |
| 2018/0214714 A1 * | 8/2018 | Carpenter ................ A61N 5/10 |
| 2019/0347282 A1 * | 11/2019 | Cai ...................... G06K 9/6231 |

* cited by examiner

FIG. 7A

Incident
INC0010006                                                    [Update] [Resolve] [Delete]

700

| Number | INC0010006 | Contact type | None |
| Caller | Joe Smith | State | In Progress |
| Category | Inquiry/Help | Impact | 1 - High |
| Subcategory | None | Urgency | 1 - High |
| Location | Chicago | Priority | 1-Critical |
| Configuration Item | | Assignment Group | |
| | | Assigned to | |

↗ 702

Short description: *email not working*

Related Search: *email not working*    [Related Search Results ▼]    ← 706

My Results | Joe Smith

Email question — I have a question about email services.

New Email Account — New Email Creation

What are phishing scams and how can I avoid them — Phishing explained Phishing Explained Phishing scams are typically fraudulent email Information to commit identity theft. One type of phishing attempt is an email message Email Interruption Tonight at 11:00 PM Eastern — if you can access a website at office or from a 3G network yet its not working

↖ 710A

Knowledge & Catalog ▼   ← 708
■ Knowledge & Catalog
  Catalog Items
  Pinned Articles
  Knowledge Articles
  Questions
  Open Major Incidents
  Open Incidents
  Resolved Incidents
  Problems

↗ 704

Problem 718

Number: PRB0090210
First reported by:
Category: Software
Subcategory: Email
Business service: Email
Configuration item: Email State: None
Impact: 2 - High
Urgency: 2 - High
Priority: 2 - High
Assignment Group:
Assigned to: Adam Miller Problem Statement: Employees in the Chicago Sales Department are unable to access email services
Description: The WiFi routers in the Chicago sales department have been updated and now employees in that department have been reporting that their email service is not working, as they are unable to access corporate email.
Primary Known Error Article:
Workaround:

[Add to Incident] — 722

800 — PROVIDE, BY A COMPUTING SYSTEM AND TO A CLIENT DEVICE ASSOCIATED WITH A MANAGED NETWORK, A REPRESENTATION OF A GRAPHICAL USER INTERFACE THAT COMPRISES A FIRST PANE AND A SECOND PANE, WHERE THE COMPUTING SYSTEM INCLUDES A DATABASE DEVICE DISPOSED WITHIN A REMOTE NETWORK MANAGEMENT DATA CENTER THAT MANAGES THE MANAGED NETWORK, WHERE THE DATABASE DEVICE CONTAINS (I) A PLURALITY OF INCIDENT RECORDS THAT INCLUDE INFORMATION ABOUT REPORTED ISSUES WITH CONFIGURATION ITEMS RELATED TO THE MANAGED NETWORK, AND (II) A PLURALITY OF INFORMATION RESOURCES RELATED TO AT LEAST SOME OF THE REPORTED ISSUES, WHERE THE PLURALITY OF INFORMATION RESOURCES ARE ORGANIZED INTO CATEGORIES, WHERE THE FIRST PANE INCLUDES INFORMATION FROM A PARTICULAR INCIDENT RECORD OF THE PLURALITY OF INCIDENT RECORDS, AND WHERE THE SECOND PANE INCLUDES A SEARCH FIELD ENABLING ENTRY OF A DESCRIPTION, AND A MENU ENABLING SELECTION FROM THE CATEGORIES

802 — RECEIVE, BY THE COMPUTING SYSTEM AND FROM THE CLIENT DEVICE, (I) A KEYWORD ENTERED IN THE SEARCH FIELD TO PROVIDE THE DESCRIPTION AND (II) A SELECTION, FROM THE MENU, OF ONE OR MORE OF THE CATEGORIES

804 — PROVIDE, BY THE COMPUTING SYSTEM AND TO THE CLIENT DEVICE, AN UPDATED REPRESENTATION OF THE GRAPHICAL USER INTERFACE IN WHICH THE SECOND PANE ALSO INCLUDES SEARCH RESULTS THAT ARE BASED ON THE KEYWORD AND THAT COMPRISE ONE OR MORE INFORMATION RESOURCES FROM ONE OR MORE OF THE CATEGORIES THAT WERE SELECTED, WHERE THE ONE OR MORE INFORMATION RESOURCES ARE RESPECTIVELY ASSOCIATED, ON THE UPDATED REPRESENTATION, WITH CONTROLS

806 — RECEIVE, BY THE COMPUTING SYSTEM AND FROM THE CLIENT DEVICE, INPUT INDICATING ACTIVATION OF ONE OF THE CONTROLS, AND RESPONSIVELY STORING, IN THE DATABASE DEVICE, A LINK BETWEEN THE PARTICULAR INCIDENT RECORD AND THE INFORMATION RESOURCE ASSOCIATED WITH THE ACTIVATED CONTROL

FIG. 8

USER INTERFACE FOR CONTEXTUAL SEARCH

BACKGROUND

Management of an enterprise's network may involve discovering issues with devices of the network and subsequently working to resolve these issues. For example, individual(s) at the enterprise could report that some devices encountered software defects, hardware defects, internet connectivity issues, printing issues, error messages, and/or phishing attempts, among others. In such situations, agents, such as information technology (IT) professionals, may be tasked to assist with resolution of at least some of the reported issues.

SUMMARY

Generally, an enterprise may rely on a remote network management platform (also referred to as a remote network management data center) to assist with management the enterprise's network. For example, the platform may have a database device containing incident records that include information about reported issues with devices and/or software of the enterprise. Also, the database device may contain problem records that each respectively describes an issue commonly specified in one or more incident records. On this point, the database device may contain link(s) between a given problem record and incident record(s) to which the given problem record is related according to the common issue. As such, a given problem record could assist with management of an issue reported in several incident records, such as by assisting with evaluation of a root cause of this issue and/or by assisting with more efficient resolution of this issue when it is encountered by many devices, among other possibilities.

Moreover, the database device of the platform might contain various information resources that may assist with resolution of at least some of the reported issues. One example of such information resources may be the incident and/or problem records, especially those that have been resolved and thus include information about how certain issues were handled. In another example, information resources may be knowledge base articles that include information to assist with resolution of some issues, such as by describing a procedure to resolve an issue and/or research conducted with respect to an issue, among other possibilities. In yet another example, information resources may be catalogs, such those that list hardware and/or software products for purchase and that include information about such products.

Given this, enterprise software, such as a desktop or web-based application developed for usage by individual(s) associated with the enterprise's network, may include features that enable reporting of issues and provide access to the above-described incident records, problem records, and/or information resources. Thus, the enterprise software may include features that agent(s) could use when assisting with resolution of reported issue(s).

Nevertheless, agent(s) may still encounter some challenges when providing this assistance. For example, agent(s) might end up spending an undesirable amount of time searching for information that may help with resolution of a reported issue. In another example, agent(s) may attempt to identify incident records that are related to each another, so as to link those incident records to a problem record and thus more efficiently facilitate resolution of the issue commonly specified in those incident records. Yet, the database device may contain numerous (e.g., over a hundred thousand) incident records, and thus agent(s) might end up spending an undesirable amount of time attempting to identify related incident records.

The embodiments described herein relate to a graphical user interface (GUI) that helps streamline the process of resolving reported issues with an enterprise's managed network.

As an initial matter, the disclosed GUI may have first and second panes in a single window, which allow for simultaneous display of both information from an incident record and information from select categories that may help resolve the issue specified in the displayed incident record.

Specifically, the first pane may include information from a particular incident record, such as text provided by an individual to explain a reported issue, for example. Whereas, the second pane may include a search field that enables entry of keyword(s) related to the issue, and may also include a menu that enables selection from among various categories established for information resources (e.g., "catalogs" and "knowledge base articles" categories). In turn, when an agent provides keyword(s) via the search field and selects one or more categories from the menu, the second pane may update to display search results that are based on these keyword(s) and that include information resources from the selected categories.

As a result, an agent could search for and/or review information from select categories that may help with resolution of a reported issue, all while relevant information from a particular incident record is also conveniently being displayed. This may help avoid time-consuming navigation between multiple GUI windows, such as to one window for reviewing an incident record and to many other windows for searching and/or reviewing helpful information under various categories, thereby saving the agent significant time and effort.

Moreover, the disclosed GUI may provide, among other features, controls that conveniently enable linking of the incident record displayed in the first pane to one or more of the information resources included in the search results within the second pane. In particular, information resources in the search result may be respectively associated with controls, such that activation of a given control (e.g., through press of a button shown on the GUI) triggers storing of a link between the displayed incident record and the information resource associated with the given control. In practice, storing of such a link may involve copying information from the information resource into the incident record and/or designating the information resource and the incident record as being related, among other options.

By way of example, one of the search results may be a particular problem record that describes an issue specified in the displayed incident record, and an agent may press an "add to incident" button shown on the GUI near that search result, so as to trigger storing of a link indicating that these incident and problem records are related. Thus, the disclosed GUI may also help an agent save time in identifying and/or linking related incident records by leveraging a problem record, and in turn help the agent more efficiently facilitate resolution of the issue commonly specified in those incident records. Moreover, once the incident record has been linked to the problem record, agent(s) handling similar incident record(s) in the future could come across this incident record in search results via the disclosed GUI, and then determine that it has been linked to the problem record, thereby helping these agent(s) easily identify a problem record that can be linked to the similar incident record(s). Other examples are also possible.

Accordingly, a first example embodiment may involve a computing system including (i) a database device disposed within a remote network management data center that manages a managed network and (ii) one or more server devices associated with the remote network management data center. The database device may contain (i) a plurality of incident records that include information about reported issues with configuration items related to the managed network, and (ii) a plurality of information resources related to at least some of the reported issues, where the plurality of information resources are organized into categories. The one or more server devices may be configured to: provide, to a client device associated with the managed network, a representation of a graphical user interface that comprises a first pane and a second pane, where the first pane includes information from a particular incident record of the plurality of incident records, and where the second pane includes a search field enabling entry of a description, and a menu enabling selection from the categories; receive, by way of the graphical user interface and from the client device, (i) a keyword entered in the search field to provide the description and (ii) a selection, from the menu, of one or more of the categories; provide, to the client device, an updated representation of the graphical user interface in which the second pane also includes search results that are based on the keyword and that comprise one or more information resources from one or more of the categories that were selected, where the one or more information resources are respectively associated, on the updated representation, with controls; and receive, by way of the graphical user interface and from the client device, input indicating activation of one of the controls, and responsively store, in the database device, a link between the particular incident record and the information resource associated with the activated control.

A second example embodiment may involve providing, by a computing system and to a client device associated with a managed network, a representation of a graphical user interface that comprises a first pane and a second pane, where the computing system includes a database device disposed within a remote network management data center that manages the managed network, where the database device contains (i) a plurality of incident records that include information about reported issues with configuration items related to the managed network, and (ii) a plurality of information resources related to at least some of the reported issues, where the plurality of information resources are organized into categories, where the first pane includes information from a particular incident record of the plurality of incident records, and where the second pane includes a search field enabling entry of a description, and a menu enabling selection from the categories. The second example embodiment may also involve receiving, by the computing system and from the client device, (i) a keyword entered in the search field to provide the description and (ii) a selection, from the menu, of one or more of the categories. The second example embodiment may further involve providing, by the computing system and to the client device, an updated representation of the graphical user interface in which the second pane also includes search results that are based on the keyword and that comprise one or more information resources from one or more of the categories that were selected, where the one or more information resources are respectively associated, on the updated representation, with controls. The second example embodiment may yet further involve receiving, by the computing system and from the client device, input indicating activation of one of the controls, and responsively storing, in the database device, a link between the particular incident record and the information resource associated with the activated control.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A depicts a representation of a graphical user interface, in accordance with example embodiments.

FIG. 7C depicts another representation of the graphical user interface, in accordance with example embodiments.

FIG. 8 is a flow chart, in accordance with example embodiments.

DETAILED DESCRIPTION

Figure 1:
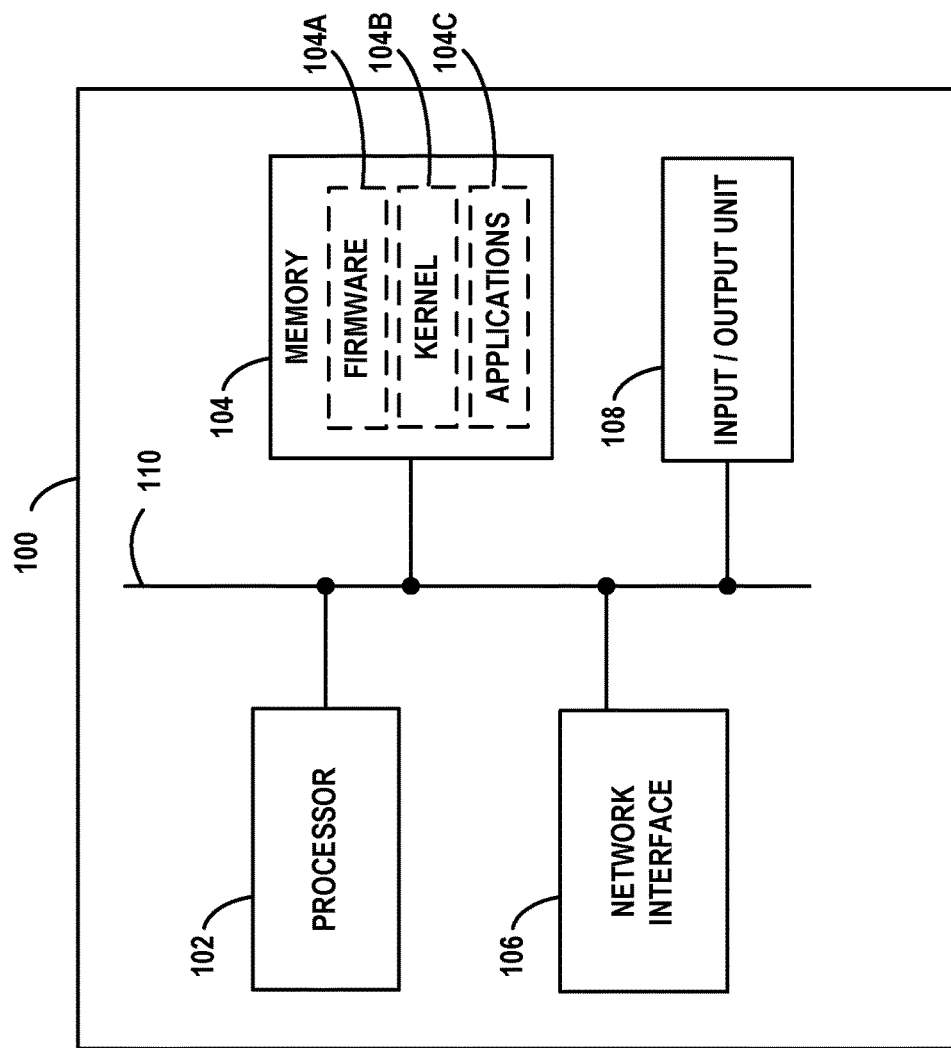
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
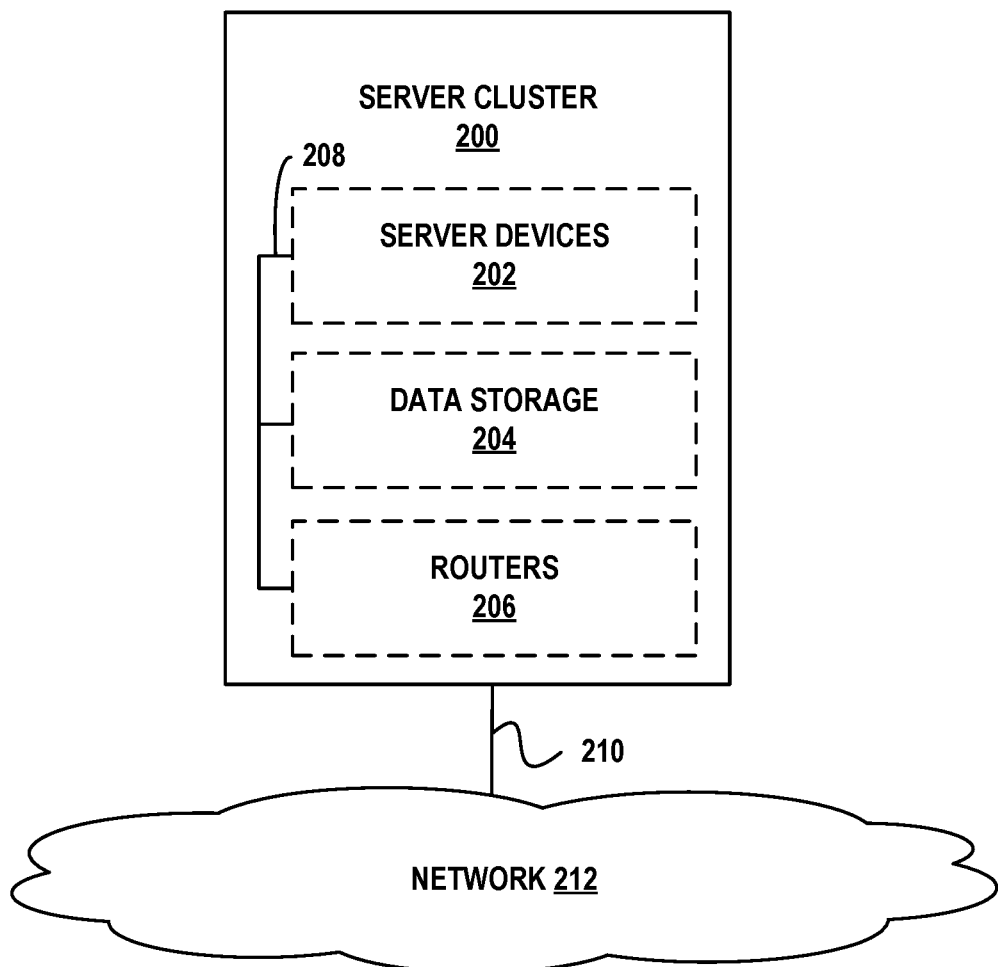
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
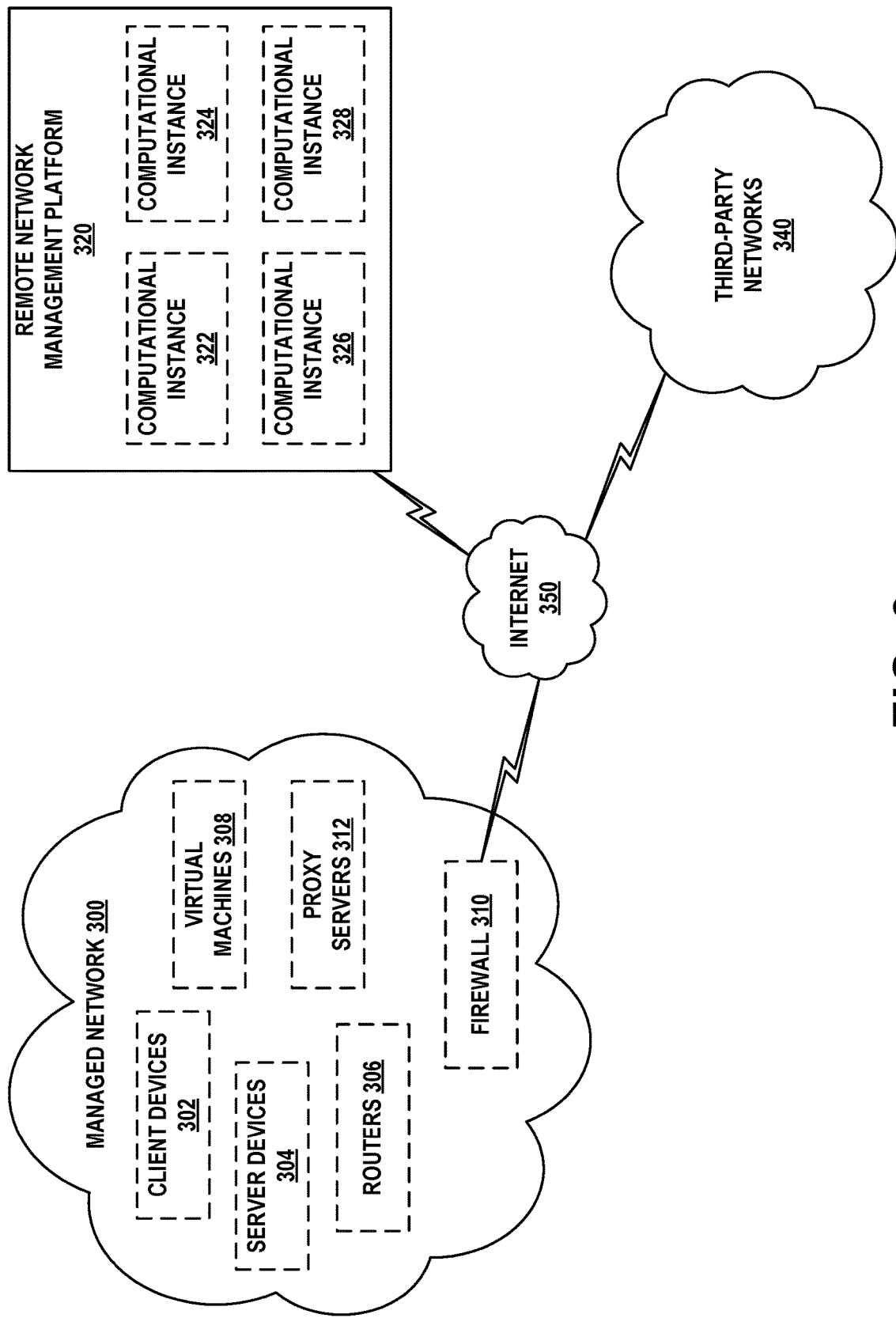
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
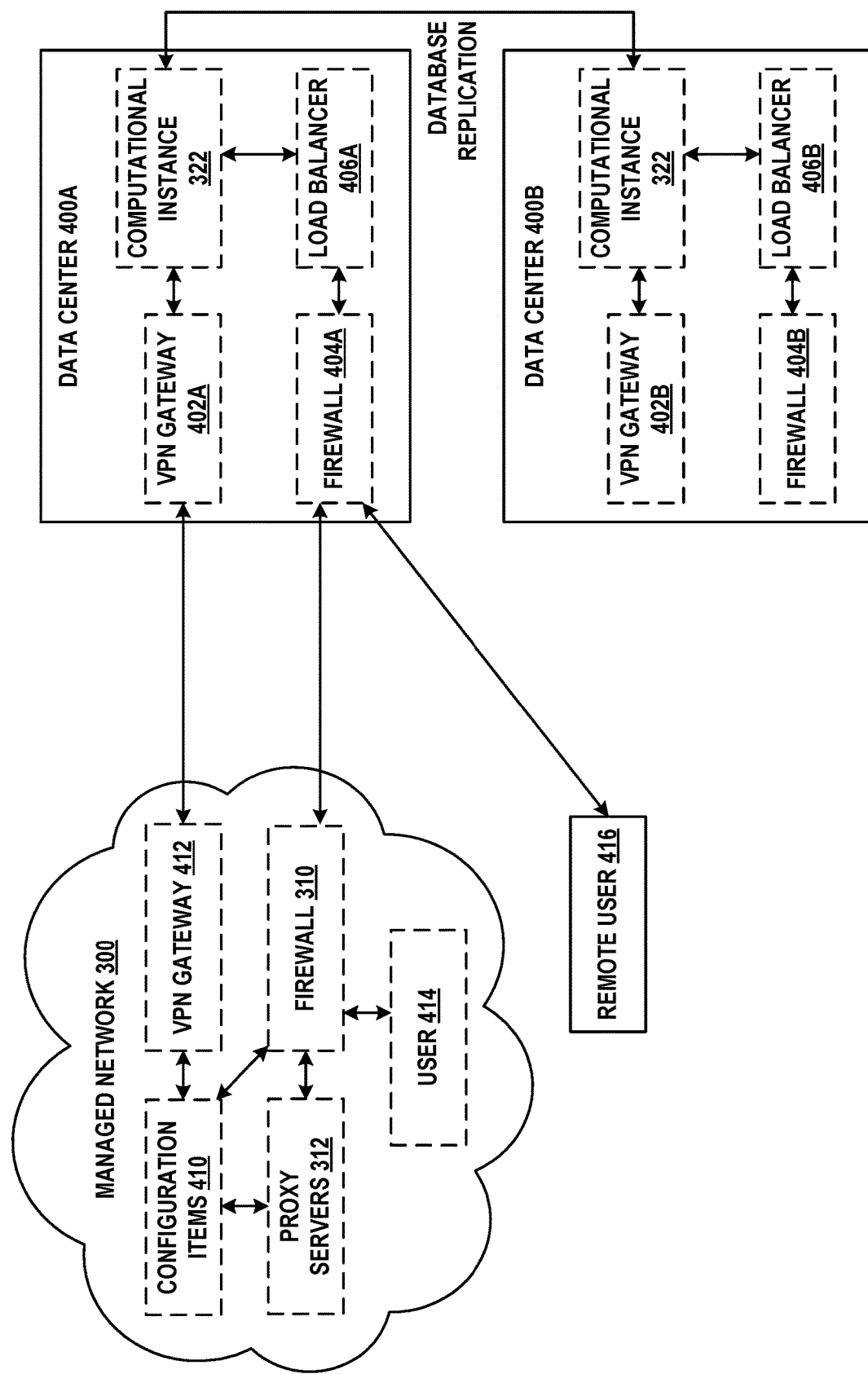
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
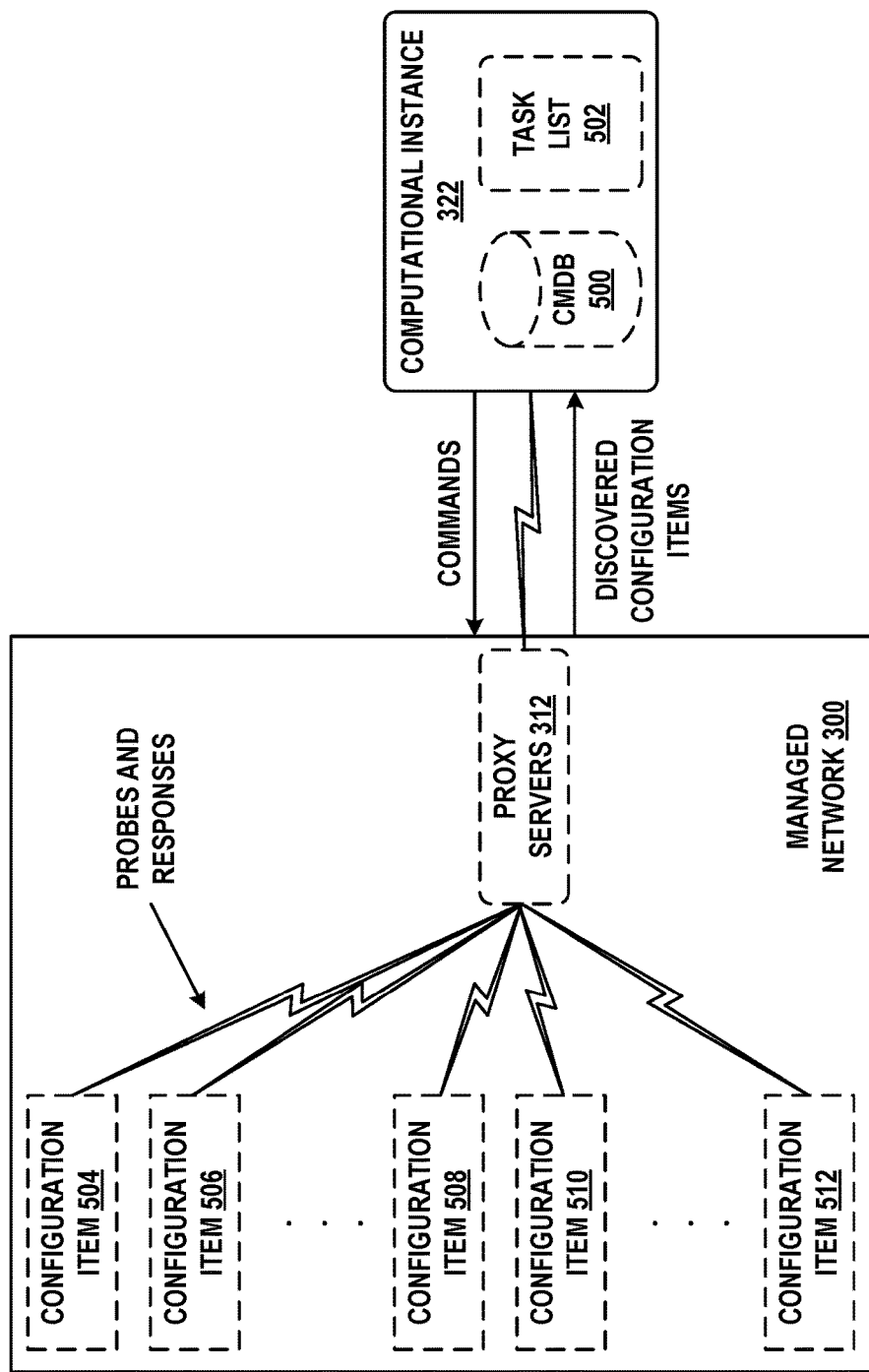
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
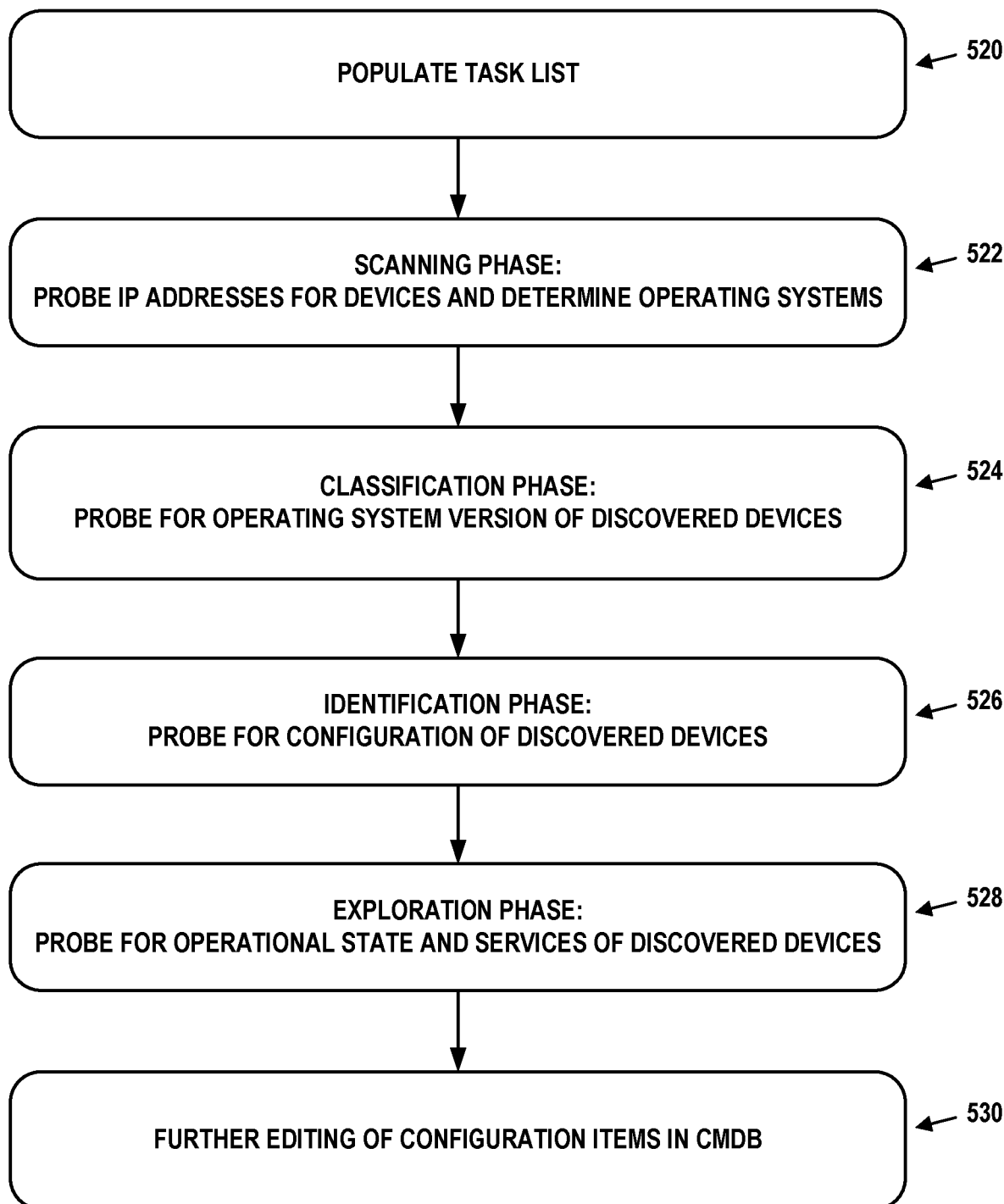
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Incident and Problem Records

In practice, users may encounter various issues when using devices, applications, and/or services associated with the managed network 300. By way of example, a user may encounter a computer crashing, internet connectivity issues, printing issues, error messages, phishing attempts, and/or slow performance of a service. In yet other examples, a user may be unable to log on to a service and/or may request new equipment or software, and so on.

Given this, the remote network management platform 320 may provide a service that allows user(s) to report issues with configuration items of the managed network 300, and that allows agent(s) to track and/or manage such issues. For example, a user could report an issue by using a client device 302 to submit a trouble ticket or help request via a desktop or web-based application associated with the remote network management platform 320. And an agent (e.g., member of an enterprise's IT team) tasked with resolving the reported issue could view information about this issue, also via an application on a client device 302, for example.

More specifically, when a user of managed network 300 reports an issue, a corresponding record may be generated and stored at a database device of the remote network management platform 320. Such a record may be referred to herein as an "incident record" and may include information related to the reported issue.

Generally, an incident record can be generated in various ways. For instance, the remote network management platform 320 can be configured to automatically generate the incident record upon receipt of certain information from the user related to the issue (e.g., receipt of a trouble ticket or help request). Additionally or alternatively, an agent or other authorized administrator may generate the incident record via an application or the like, such as according to information about the reported issue as received from the user. Further, upon generation of the incident record, the incident record may be manually or automatically assigned to an agent, so that the agent is effectively tasked with resolving the reported issue specified in the incident record. Through an application or the like, the agent may access and review the incident record, and may begin providing assistance to the user in an attempt to resolve the issue.

Further, an incident record can take the form of a set of data that represents a variety of information, or "components," associated with a reported issue. Such components can include, for example: (i) an identifier of a user reporting the issue (e.g., the user's name, or a unique string of characters associated with the user), (ii) a status of the incident record (e.g., open, unassigned, in progress, closed), (iii) a description of the issue (e.g., a manually, semi-autonomously, or fully-autonomously generated textual summary of the problem the user has encountered), (iv) a date/time when the incident record is created, (v) dates/times when the status of the issue or any other information of the incident record is changed, (vi) a current owner of the incident record (e.g., the agent or group of agents assigned to resolve the issue), (vii) a priority level for the incident record (e.g., low, medium, or high), (viii) information indicating any efforts that have been made towards resolving the issue (e.g., dates/times such efforts were started and/or completed, and a description of such efforts), (ix) an incident number, (x) a date/time by which resolution of the issue is due or requested by the user to be completed, and/or other information. This information may be textual, and/or may include images, sounds, videos, etc.

In addition, the remote network management platform 320 may generate, store, and/or provide access to "problem records". A problem record may describe or otherwise relate to an issue commonly specified in a number of incident records. On this point, the database device of the remote network management platform 320 may contain link(s) between a given problem record and incident record(s) to which the given problem record is related according to the common issue. As such, a given problem record could assist with management of an issue commonly reported in several incident records.

Generally, a problem record can be generated in various ways. For instance, the remote network management platform 320 can be configured to autonomously generate the problem record upon a determination that a threshold number of incident records specify the same issue. Additionally or alternatively, an agent or other authorized administrator may generate the problem record via an application or the like, such as according to information in several related incident records. During this process, the remote network management platform 320 may store link(s) between the problem record and the related incident record(s). Further, through an application or the like, an agent may access and review the problem record, which may assisting the agent with evaluation of a root cause of the issue reported in several incident records and/or with more efficient resolution of this issue when it is encountered by many devices, among other advantages.

Further, a problem record can take the form of a set of data that represents information including, for example: (i) identifier(s) of user(s) reporting the issue specified in the related incident records, (ii) a status of the problem record, (iii) a description of the issue, (iv) a date/time when the problem record is created, (v) dates/times when the status of the issue or any other information of the problem record is changed, (vi) a current owner of the problem record (e.g., the agent or group of agents assigned to resolve the issue), (vii) a priority level for the problem record, (viii) information indicating any efforts that have been made towards resolving the issue, (ix) identifier(s) of incident record(s) related to the problem record, (x) a date/time by which resolution of the issue is due or requested to be completed, and/or other information. Here again, the information may be textual, and/or may include images, sounds, videos, etc.

In an example scenario, numerous incident records might each respectively indicate that individual(s) at an enterprise are unable to access email services after WiFi routers at the enterprise have been updated. And agent(s) may generate a problem record indicating that individuals at the enterprise are unable to access email services following the update of the WiFi routers at the enterprise. Then, the agent(s) may link these incident records to the generated problem record, so that, once a solution for restoring access to email services has been determined, agent(s) could leverage the problem record to easily identify all related incident records for which that solution should be applied. Other example scenarios are also possible.

VII. Improved User Interface for Contextual Search

Although a remote network management platform may provide service(s) that assist with reporting, tracking, management, and/or handling of issues associated with a managed network, agent(s) may still encounter some challenges when providing assistance. For example, an agent may spend an undesirable amount of time navigating between various GUI windows, such as to one window for reviewing an incident record and to many other windows for searching and/or reviewing helpful information under various categories. In another example, an agent may spend an undesirable amount of time attempting to identify related incident records and, in some scenarios, might not even identify all such related incident records.

Disclosed herein is an improved GUI to help streamline resolution of reported issues in an enterprise's managed network.

Figure 6:
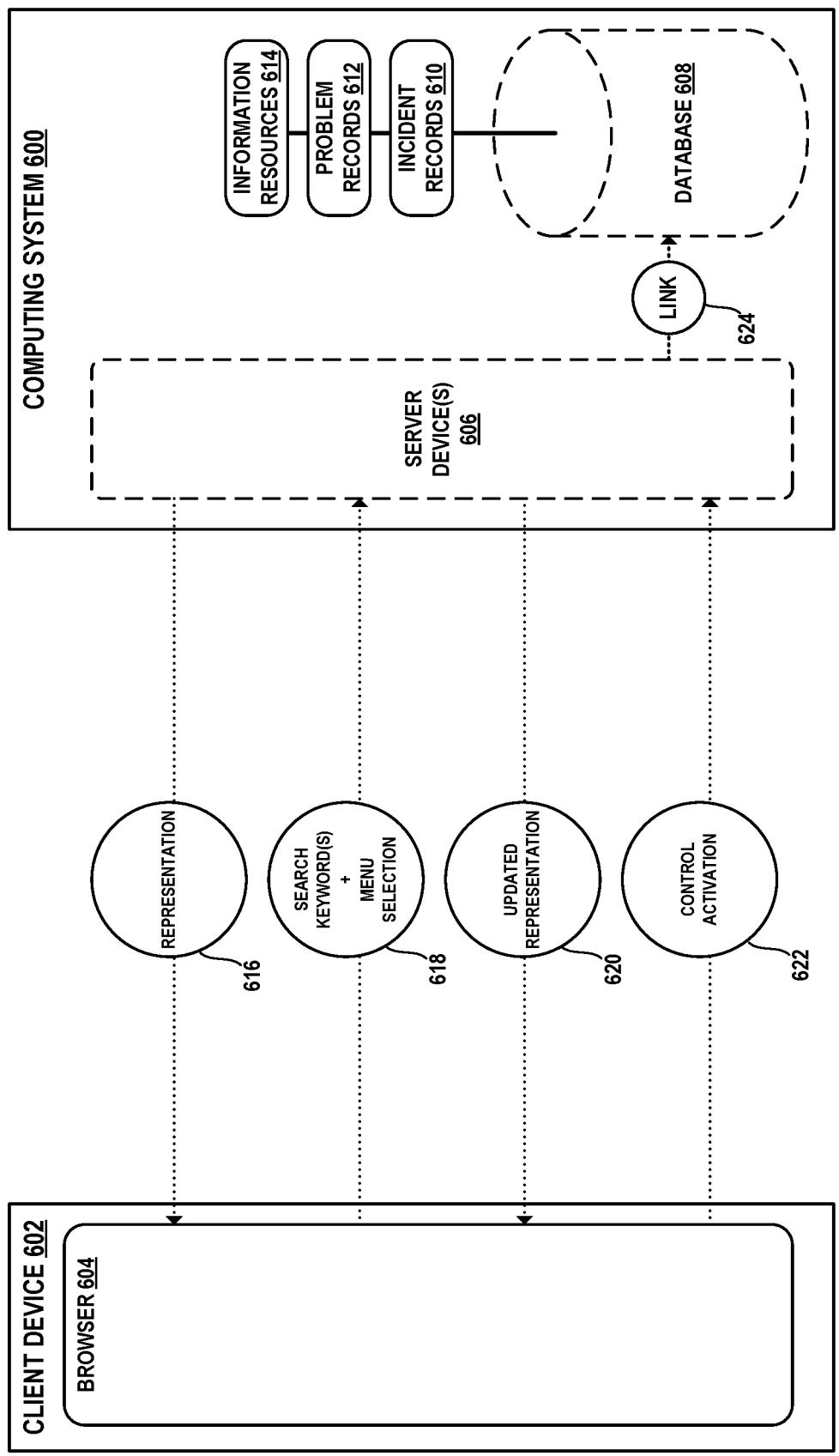
FIG. 6 depicts communications between a computing system and a client device, in accordance with example embodiments.

FIG. 6 illustrates features, components, and/or operations of a computing system 600 and of a managed network's client device 602. Although FIG. 6 illustrates a specific arrangement, operations disclosed herein may be carried out in the context of similar and/or other arrangement(s) as well without departing from the scope of the present disclosure.

Specifically, client device 602 may be one of the client devices 302 on the managed network 300, for example. Generally, the client device 602 may engage in communication with computing system 600, such as via wired and/or wireless communication link(s) (not shown). Moreover, as shown, the client device 602 may be configured to operate a web browser 604, which is an application that may retrieve, present, and/or navigate through information on the World Wide Web and/or on private websites.

The browser 604 may include a web-display tool (not shown) that provides for or otherwise supports display of information, such as information received from computing system 600. For example, the web-display tool may display the disclosed GUI that may help agent(s) streamline resolution of reported issues.

Further, computing system 600 may include server device(s) 606. The server device(s) 606 may contain or may otherwise have access to program instructions executable by processor(s), so as to cause the computing system 600 to carry out various operations described herein. On this point, the server device(s) 606 may include server device(s) disposed within a computational instance of a remote network management platform, such as computational instance 322 of remote network management platform 320, and/or may include server device(s) disposed within a managed network. Thus, the various operations described herein could be carried out by just one server device and/or could be distributed among two or more of server devices in any feasible manner. As such, the computing system 600 could include features and/or components of a managed network and/or of a remote network management platform that supports remote management of the managed network.

Also, the computing system 600 may include a database 608. This database 608 could be a CMDB of a computational instance, such as CMDB 500 for example. Additionally or alternatively, database 608 may be a database that is different from a CMDB.

As shown, the database 608 contains incident records 610 and problem records 612, which could be arranged as described herein. In line with the discussion above, incident records 610 may include information about reported issues with configuration items related to the managed network 300. And each problem record 612 may describe an issue related to a number of incident records 610 that commonly specify an issue.

Moreover, the database 608 contains information resources 614 that may include information to assist with resolution of at least some of the reported issues. The information resources 614 could be downloaded from the web, generated by users of the managed network 300, and/or uploaded by individuals associated with the remote network management platform 320, among other possibilities.

In one case, incident record(s) 610 and/or problem record(s) 612 may be at least some of the information resources 614 contained in the database 608. Specifically, such records, whether they are still open or already resolved, may include information about how certain issues were or are being handled. Thus, information in incident record(s) 610 and/or problem record(s) 612 may assist agent(s) with resolution of reported issue(s).

In another case, the information resources 614 may include one or more knowledge base articles that include information related to resolution of at least some issues. For example, a knowledge base article may describe a procedure to resolve an issue. In another example, a knowledge base article may describe research conducted with respect to an issue. In yet another example, a knowledge base article may describe how to use certain software and/or hardware. Other examples are also possible.

In yet another case, the information resources 614 may include one or more catalogs. For example, a catalog may list hardware and/or software products for sale or otherwise available and may include information about such products. In another example, a catalog may list of hardware and/or software products found in an inventory of an enterprise, and may include information about such products. Other cases and examples are also possible.

In this regard, the information resources 614 may be organized into categories in the database 608. For example, incident records 610 that are designated as unresolved (e.g., have a status of "open", "unassigned", and/or "in progress") may be organized into an "open incidents" category arranged for such unresolved incident records 610, and incident records 610 that are designated as resolved (e.g., have a "closed" status) may be organized into a "resolved incidents" category arranged for such resolved incident records 610. In another example, problem records 612 may be organized into a "problems" category arranged to include problem records 612, regardless of the status of a given problem record. In yet another example, knowledge base articles may be organized into a "knowledge articles" category arranged to include knowledge base articles. In yet another example, catalogs may be organized into a "catalog items" category arranged to include catalogs. Other examples are also possible.

In a system arranged as described above, the computing system 600 may be configured to provide to a representation 616 of the disclosed GUI for display by the client device 602. The representation 616 may both display information from a particular incident record and may include features that enable searching for helpful information under various categories. Given this, the computing system 600 may provide the representation 616 in response a request, from the client device 602, to display the particular incident record on the browser 604, or could do so in response to other triggers.

In any case, the representation 616 may have first and second panes in a single GUI window. The first pane may include information from the particular incident record, such as an incident number, an identifier of a user reporting the issue, a description of the issue, a priority level for the particular incident record, and/or any of the other components described herein, among others. On the other hand, the second pane may include a search field that enables entry of keyword(s) related to the issue, and may also include a menu that enables selection from among the above-described categories of information resources 614.

When keyword(s) are entered in the search field and one or more categories are selected from the menu, this may trigger a corresponding search by the computing system 602 for information resources 614 that are in the selected categories and that include relevant information based on the entered keyword(s). This search may be carried out according to currently known and/or future-developed search technologies, such as through a text-based search engine that applies keyword matching and/or machine learning techniques to determine search results, among other options. For example, if the keyword "email" is entered in the search field and the "knowledge articles" category is selected from the menu, this may trigger a corresponding search by the computing system 602 for knowledge base articles that contain the word "email". Other examples are also possible.

In some implementations, the second pane of the representation 616 may initially display search options and/or search results based on information from the particular incident record being displayed in the first pane. In particular, the first pane may display a description of the issue specified in the particular incident record, which may take the form of a textual explanation of the issue (e.g., as provided by a user reporting the issue). As a result, the search field in the second pane may initially include a modifiable version of this textual explanation by default, thereby conveniently providing an initial search option to an agent attempting to resolve the issue specified in the particular incident record. Additionally, the computing system 602 may automatically carry out a search based on this textual explanation, and may automatically cause display of corresponding search results in the second pane of the representation 616, thereby conveniently providing initial search results to the agent attempting to resolve the issue.

Accordingly, the computing system 600 may receive, from the client device 602, input data 618 indicative of keyword(s) entered in the search field and of one or more categories selected from the menu, and the computing system 600 may responsively initiate a corresponding search and then provide an updated representation 620 of the GUI that displays the search results, among other features. In practice, an agent may enter the keyword(s) in the search field, and may trigger the corresponding search and display of the search results by pressing a button on a keyboard (e.g., "Enter" button), among other options.

In one case, the search field in the representation 616 may initially be an empty field that does not initially display any keyword(s) as search options, and the input data 618 may indicate keyword(s) that were entered in the search field to populate the empty field. In another case, the search field in the representation 616 may initially include the modifiable version of the textual explanation, and the input data 618 may indicate this textual explanation as the keyword(s) entered in the search field. In yet another case, given that the second pane in the representation 616 may include the modifiable version of the textual explanation, the search field may enable removal, addition, and/or replacement of one or more of the characters included in the textual explanation. As such, the input data 618 may indicate a modified textual explanation as the keyword(s) entered in the search field. Other cases are also possible.

In any case, the updated representation 620 may be arranged for simultaneous display of both information from an incident record and information that may help resolve the issue specified in that incident record, among other features.

More specifically, in the updated representation 620, the second pane may display the search results that are based on the keyword(s) and that include information resource(s) 614 from the selected categories. Additionally, the updated representation 620 may include the first pane as in the initial representation 616, which may display the information from the particular incident record. Further, the updated representation 620 may include the search field and the menu as in the initial representation 616, which may allow for initiation of yet another search that may result in display of yet another updated representation of the GUI including updated search results, and so on.

As a result, an agent could use the disclosed GUI to search for and/or review information from select categories that may help with resolution of a reported issue, all while relevant information from a particular incident record is also conveniently being displayed. This may help avoid the time-consuming navigation between multiple GUI windows as described, thereby saving the agent significant time and effort.

Furthermore, the updated representation 620 may display controls that enable linking of (i) the particular incident record displayed in the first pane of the updated representation 620 to (ii) one or more of the information resources included in the search results within the second pane of the updated representation 620. In this regard, one or more information resources included in the search results may be respectively associated with such controls. In practice, these controls may take the form, for example, of buttons shown on the GUI, and each respective button may be displayed on the GUI substantially near the information resource with which the respective button is associated. Other examples are also possible.

Given this, the computing system 600 may receive, from the client device 602, input data indicating activation 622 of a given control and may responsively store, in the database 608, a link 624 between the particular incident record and the information resource associated with the given control. According to the present disclosure, storing of such a link 624 may take various forms.

In one case, storing the link 624 may involve copying information from the information resource associated with activated control 622 into the particular incident record. In particular, the computing system 600 may copy information from the information resource into the set of data forming the particular incident record. This may involve adding the copied information to one of the components of the particular incident record and/or replacing information in one of the components with the copied information.

For example, one of the search results may be a particular knowledge base article that describes a procedure for resolving the issue specified in the particular incident record, and an agent may press a "copy to incident" button shown on the GUI near that search result, so as to trigger copying of the procedure from the particular knowledge base article to the particular incident record. In this way, the GUI may allow the agent to easily populate the particular incident record with the procedure for resolving the issue, rather than requiring the agent to manually enter the procedure into the particular incident record.

In another case, the link 624 may indicate that the particular incident record is related to another incident record. In particular, the computing system 600 may store metadata that generates an association between the incident records. Additionally or alternatively, the computing system 600 may add, to the set of data forming the particular incident record, a designation of the other incident record being related to the particular incident record, so that this designation is visible to an agent reviewing the particular incident record via a client device.

For example, one of the search results may be another incident record that describes the same issue also described in the particular incident record, and an agent may press an "add to incident" button shown on the GUI near that search result, so as to trigger storing of a link indicating that these incident records are related. Thus, the disclosed GUI may also help an agent save time in identifying and/or linking related incident records, and in turn help the agent more efficiently facilitate resolution of the issue commonly specified in those incident records.

In yet another case, the link 624 may indicate that the particular incident record is related to a particular problem record. In particular, the computing system 600 may store metadata that generates an association between the particular incident record and the particular problem record, thereby effectively also generating an association between the particular incident record and other incident record(s) that have been previously linked to the particular problem record. Additionally or alternatively, the computing system 600 could add, to the set of data forming the particular incident record, a designation of the particular problem record being related to the particular incident record, so that this designation is visible to an agent reviewing the particular incident record via a client device and so that the agent could access the particular problem record by way of the particular incident record, among other options. Similarly, the computing system 600 could add, to the set of data forming the particular problem record, a designation of the particular incident record being related to the particular problem record, so that this designation is visible to an agent reviewing the particular problem record via a client device and so that the agent could access the particular incident record by way of the particular problem record, among other options.

For example, one of the search results may be a particular problem record that describes an issue specified in the particular incident record, and an agent may press an "add to incident" button shown on the GUI near that search result, so as to trigger storing of a link indicating that these incident and problem records are related. Thus, the disclosed GUI may also help an agent save time in identifying and/or linking related incident records by leveraging a problem record and, here again, may help the agent more efficiently facilitate resolution of the issue commonly specified in those incident records. Other cases and examples are also possible.

In a further aspect, the disclosed GUI may enable preview of a problem record from an incident record. In particular, the initial representation 616 and/or the update representation 620 may include an interface feature that triggers display of information from at least one of the problem records 612. In practice, this may involve display of a status of the problem record, a description of an issue related to the problem record, a priority level for the problem record, information indicating any efforts that has been made towards resolving the issue, identifier(s) of incident record (s) related to the problem record, and/or other types of information described herein with respect to problem records, among others. Thus, this interface feature may provide yet another convenient way for an agent to access information that may help with resolution of a reported issue and/or with identifying related incident records, all while relevant information from an incident record is also being displayed.

In one case, the interface feature for previewing of a problem record may take the form of a field for entering an identifier of a problem record. In this case, when an identifier of a problem record is entered and input is provided to request display of the problem record (e.g., an agent may press the "enter" button on a keyboard following entry of the identifier), the computing system 600 may responsively cause display of this problem record.

In another case, the interface feature for previewing of a problem record may take the form of a hyperlink to the problem record. In particular, if one or more of the search results in the second pane are problem records, the computing system 600 may cause display of such search results as hyperlinks that are each respectively selectable to trigger display of a problem record. Given this, when the computing system 600 receives input indicating selection of one of a given hyperlink, the computing system 600 may responsively cause display of the problem record associated with this given hyperlink. Other cases are also possible.

In either case, when the computing system 600 causes preview of a problem record from a particular incident record, the computing system 600 could facilitate this preview in various ways. In one implementation, the computing system 600 may cause display of the previewed problem record in the same GUI window in which the particular incident record is being displayed, such as within the first pane, second pane, or another pane of that window. In another implementation, the computing system 600 may cause display of the previewed problem record in a GUI window that is separate from the GUI window in which the particular incident record is being displayed. Other implementations are also possible.

Moreover, the interface feature for previewing a particular problem record from a particular incident record may also enable linking of these problem and incident records. In particular, when the computing system 600 causes preview of the problem record, the computing system 600 may provide, to the client device 602, a representation of the GUI that includes information from the particular problem record as well as an associated control configured to link the particular problem record to the particular incident record. In practice, this associated control may take the form of a button shown on the GUI, among other possibilities. Nonetheless, the computing system 600 may receive, from the client device 602, input data indicating activation of this associated control and may responsively store, in the database 608, a link indicating that the particular incident record and the particular problem record are related.

In yet a further aspect, the computing system 600 may provide, to the client device 602, an administrative representation of the GUI that allows a user to configure various attribute(s) of the initial representation 616 and/or of the updated representation 620. The computing system 600 may provide this administrative representation only to certain users of the managed network 300 (e.g., an administrator), such as in response to verifying that a particular user-account requesting display of the administrative representation is authorized to access the administrative representation. Thus, an authorized user could use the administrative representation to configure the disclosed GUI in accordance with preferences of individual(s) (e.g., IT professionals) at an enterprise, among other advantages.

Specifically, the administrative representation may include an interface feature that enables set up of one or more of the categories to be shown in the menu. For example, the interface feature may include field(s) for providing a name, an identifier, and/or a description of a category being set up. In another example, the interface feature may include a field for selecting type(s) of information resources 614 to be included in the category (e.g, incident records, problem records, knowledge base articles, and/or catalogs). In yet another example, the interface feature may include field(s) to enter filter conditions for information resources 614 to be included in the category being set up. In a specific example, entry of filter condition(s) may involve selection of a time frame associated with information resources 614, such as for causing only information resources 614 created during that selected time frame to be included in the category. In another specific example, entry of filter condition(s) may involve selection of a status associated with information resources 614, such as for causing only information resources 614 having that selected status to be included in the category (e.g., only open incident records, rather than any incident record). Other examples are also possible.

Additionally or alternatively, the administrative representation may include an interface feature that enables selection of information resources 614 permitted for inclusion in the search results within the second pane. By way of example, this interface feature may include field(s) for selecting one or more categories, so that only information resources 614 from those categories are included in the search results. In a specific example, an administrator could use this interface feature to permit inclusion of information resources 614 from any category other than the "catalogs" category. In some implementations, this interface feature may also include field(s) for specifying a desired ordering of the search results, such as by indicating that information resources 614 from a certain category (e.g., an "open incidents" category) should be displayed at the top of the search results followed by display of information resources 614 from another category (e.g., an "problems" category), and so on. Other examples are also possible.

VIII. Example Graphical User Interfaces

FIGS. 7A-7D provide an illustrative example of how a GUI could assist with management of an incident record in accordance with the present disclosure. Nonetheless, the embodiments herein can operate with a wide variety of user interface layouts and designs, and should not be viewed as limited to this example.

FIG. 7A illustrates a GUI window 700 arranged in line with the initial representation 616 described above. The window 700 has a first pane 702 that includes information from a particular incident record, such as an incident number (i.e., "INC0010006"), an identifier of a user reporting the issue (i.e., "Joe Smith"), a description of an issue (i.e., "email not working"), and a priority level (i.e., "1-Critical"), among others as shown. Additionally, the window 700 has a second pane 704 including a search field 706 enabling entry of keyword(s) related to the issue as well as a menu 708 enabling selection from among various categories. Further, the search field 706 initially includes a modifiable version of the textual explanation of the issue from the first pane 702 (i.e., "email not working"), thereby conveniently providing an initial search option to an agent attempting to resolve the issue. Moreover, the second pane 704 displays search results 710 that are based on the initial search option and that include information resources from a "knowledge & catalog" category (e.g., a category including both catalogs and knowledge base articles), thereby conveniently providing initial search results to the agent attempting to resolve the issue.

Figure 7B:
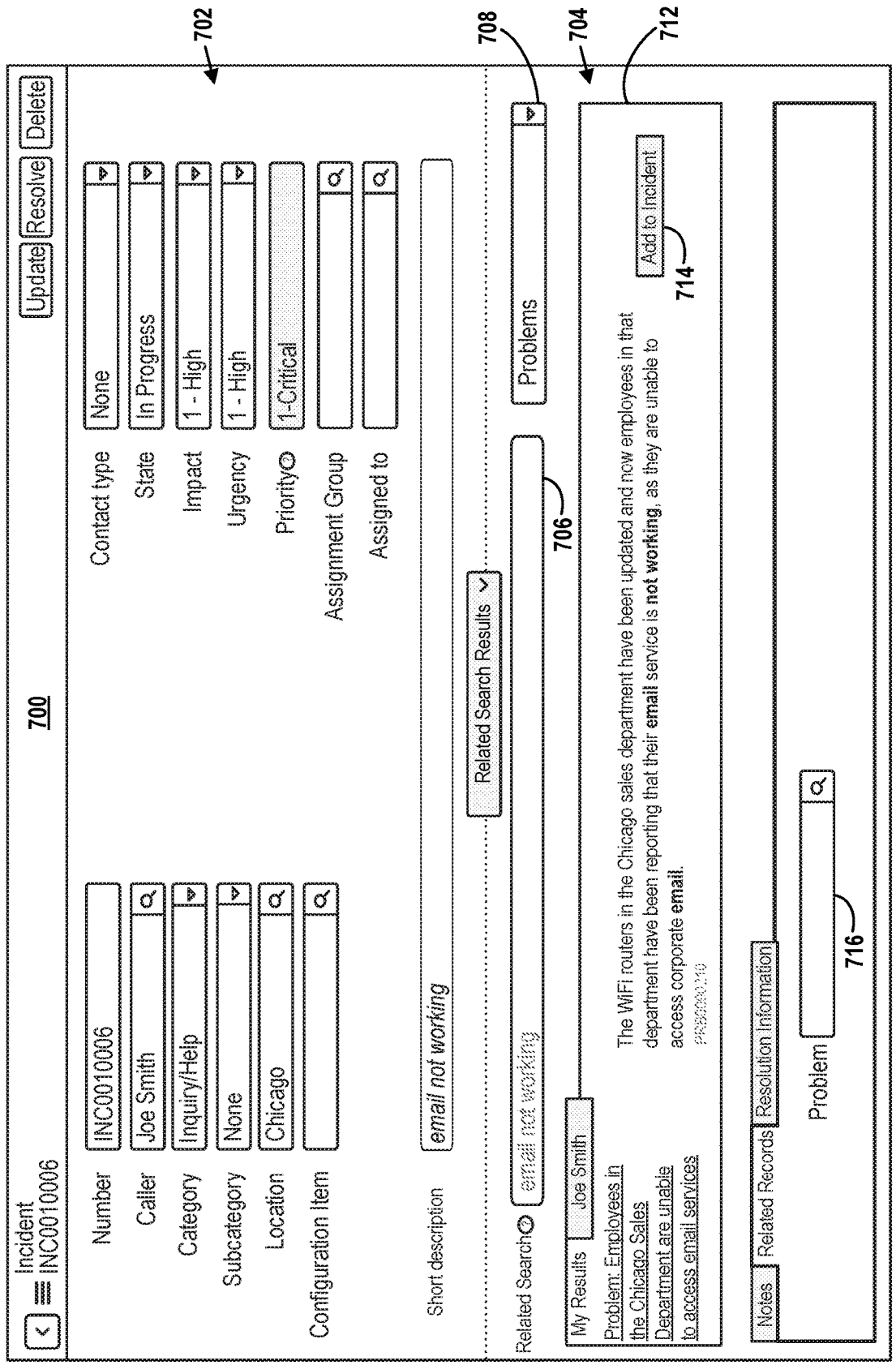
FIG. 7B depicts an updated representation of the graphical user interface, in accordance with example embodiments.

FIG. 7B illustrates an updated version of the window 700 arranged in line with the updated representation 620 described above. As shown, the window 700 still has the first pane 702 and the second pane 704. However, the window 700 was updated to show that an agent did not modify the textual explanation in the search field 706 and selected the "problems" category from the menu 708. Given this, the updated version of window 700 includes updated search results 712 in the second pane 704 that are based on the keyword of the textual explanation and that include a particular problem record having an identifier "PRB0090210". Further, the updated version of window 700 includes, in the second pane 704, a control 714 associated with this particular problem record, such that, when the control 714 is activated, the computing system 600 links the particular problem record to the incident record displayed in the first pane 702. Moreover, the updated version of window 700 includes, in the second pane 704, a field 716 that enables preview of a problem record from an incident record, such as by entering an identifier of the problem record desired for preview.

FIG. 7C illustrates a GUI window 718 previewing a problem record from an incident record. In particular, an agent may enter an identifier "PRB0090210" in the field 716, which is the identifier of the problem record included in the updated search results 712, and the computing system 600 may responsively cause display of a separate GUI window 718 that previews the problem record having the identifier "PRB0090210". As shown, the window 718 shows information 720 from this problem record, such as the identifier of the problem record (i.e., "PRB0090210"), a description of an issue related to the problem record (i.e., "Employees in the Chicago Sales Department are unable to access email services"), an agent assigned to resolve the issue (i.e., "Adam Miller"), among others as shown. Moreover, the window 718 includes a control 722 associated with this previewed problem record, such that, when the control 722 is activated, the computing system 600 links the previewed problem record to the incident record displayed in the first pane 702.

Figure 7D:
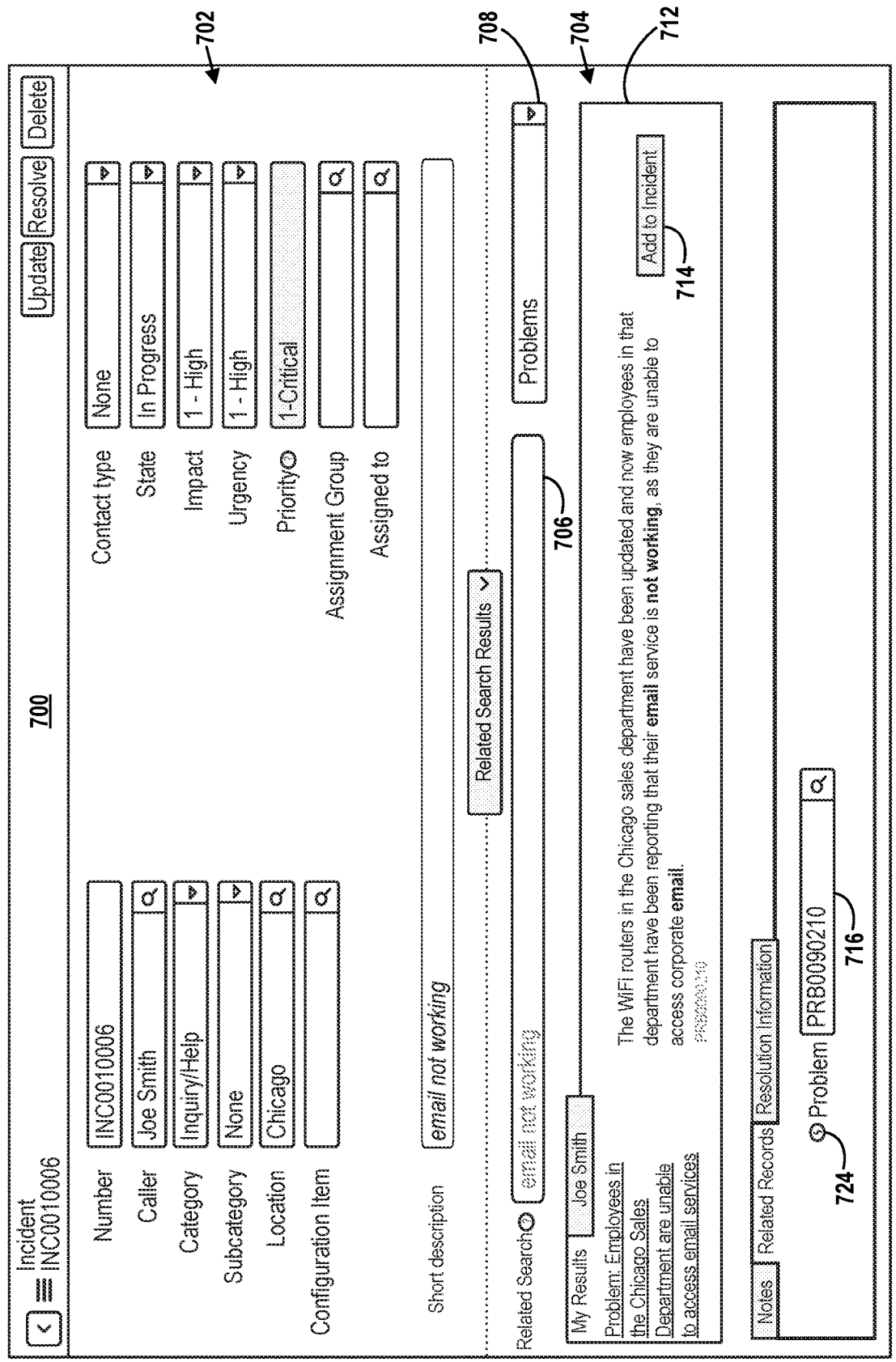
FIG. 7D depicts yet another representation of the graphical user interface, in accordance with example embodiments.

FIG. 7D illustrates a further updated version of the window 700 following linking of a previewed problem record to the incident record. In particular, an agent may activated the control 722 via the window 718 to trigger linking of the previewed problem record to the incident record displayed in the first pane 702. After activation of the control 722, the window 700 may further update to indicate that the previewed problem record was linked to the incident record. Namely, the further updated version of window 700 shows the identifier of the linked problem record in the field 716 (i.e., "PRB0090210"), and also shows a symbol 724 near the field 716 indicating that that this problem record has been linked to the incident record. Therefore, activation of the control 722 in window 718 could result in the same or similar outcome(s) (e.g., linking of a problem record to an incident record) as activation of the control 714 in window 700. Other examples and illustrations are also possible.

IX. Example Operations

FIG. 8 is a flow chart illustrating an example embodiment. The process illustrated by FIG. 8 may be carried out by a computing system, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve providing, by a computing system and to a client device associated with a managed network, a representation of a graphical user interface that comprises a first pane and a second pane, where the computing system includes a database device disposed within a remote network management data center that manages the managed network, where the database device contains (i) a plurality of incident records that include information about reported issues with configuration items related to the managed network, and (ii) a plurality of information resources related to at least some of the reported issues, where the plurality of information resources are organized into categories, where the first pane includes information from a particular incident record of the plurality of incident records, and where the second pane includes a search field enabling entry of a description, and a menu enabling selection from the categories.

Block 802 may involve receiving, by the computing system and from the client device, (i) a keyword entered in the search field to provide the description and (ii) a selection, from the menu, of one or more of the categories.

Block 804 may involve providing, by the computing system and to the client device, an updated representation of the graphical user interface in which the second pane also includes search results that are based on the keyword and that comprise one or more information resources from one or more of the categories that were selected, where the one or more information resources are respectively associated, on the updated representation, with controls.

Block 806 may involve receiving, by the computing system and from the client device, input indicating activation of one of the controls, and responsively storing, in the database device, a link between the particular incident record and the information resource associated with the activated control.

In some embodiments, one or more server devices of the computing system may carry out the process of blocks 800-806.

In some embodiments, the plurality of information resources may comprise one or more of the plurality of incident records that are organized into: (i) a category for incident records that are unresolved, or (ii) a category for incident records that are resolved.

In some embodiments, the plurality of information resources may comprise a problem record that describes an issue that is related to at least a threshold number of the plurality of incident records. In such embodiments, the database device may contain one or more links between: the problem record and one or more of the plurality of incident records to which the problem record is related.

In some embodiments, the plurality of information resources may comprise one or more knowledge base articles that contain information related to resolution of at least some of the reported issues.

In some embodiments, the updated representation may also comprise the first pane including information from the particular incident record, and the second pane on the updated representation may also include the search field and the menu.

In some embodiments, the first pane may include a textual explanation of a particular issue specified by the particular incident record, and the search field, on the second pane of the representation, may initially include a modifiable version of the textual explanation as the description.

In some embodiments, storing the link may comprise copying at least some information from the information resource associated with the activated control into the particular incident record.

In some embodiments, the particular incident record may be a first incident record, the information resource associated with the activated control may be a second incident record of the plurality of incident records, and the link may indicate that the first incident record and the second incident record are related.

In some embodiments, the information resource associated with the activated control may be a problem record that describes an issue that is related to at least a threshold number of the plurality of incident records, the particular incident record may include information about the issue, and the link may indicate that the particular incident record and the problem record are related.

In some embodiments, the database device may also contain a plurality of problem records that each respectively describe an issue that is related to at least a threshold number of the plurality of incident records, and the updated representation may also comprises an interface feature arranged to trigger display of information from one or more of the plurality of problem records.

In such embodiments, the computing system may also be configured to: receive, by way of the interface feature and from the client device, a request to display information from a particular problem record of the plurality of problem records; and in response to receiving the request, provide, to the client device, a further updated representation of the graphical user interface that includes (i) information from the particular problem record and (ii) another control that, when activated, links the particular problem record to the particular incident record.

In some embodiments, the computing system may also be configured to: provide, to the client device, an administrative representation of the graphical user interface that includes one or more of: (i) a first interface feature that enables set up of one or more of the categories, and (ii) a second interface feature that enables selection of information resources, of the plurality of information resources, permitted for inclusion in the search results.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a database device disposed within a remote network management data center that manages a managed network, wherein the database device contains (i) a plurality of incident records that include information about reported issues with configuration items related to the managed network, and (ii) a plurality of information resources related to at least some of the reported issues, wherein the plurality of information resources are organized into categories; and
one or more server devices, associated with the remote network management data center, and configured to:
provide, to a client device associated with the managed network, a representation of a graphical user interface that comprises a first pane and a second pane, wherein the first pane includes information from a particular incident record of the plurality of incident records, and wherein the second pane includes a search field enabling entry of a description, and a menu enabling selection from the categories;
receive, by way of the graphical user interface and from the client device, (i) a keyword entered in the search field to provide the description and (ii) a selection, from the menu, of one or more of the categories;
provide, to the client device, an updated representation of the graphical user interface in which the second pane also includes search results that are based on the keyword and that comprise one or more information resources from one or more of the categories that were selected, wherein the one or more information resources are respectively associated, on the updated representation, with controls; and receive, by way of the graphical user interface and from the client device, input indicating activation of one of the controls, and responsively store, in the database device, a link between the particular incident record and the information resource associated with the activated control.

2. The computing system of claim 1, wherein the plurality of information resources comprises one or more of the plurality of incident records that are organized into: (i) a category for incident records that are unresolved, or (ii) a category for incident records that are resolved.

3. The computing system of claim 1, wherein the plurality of information resources comprises a problem record that describes an issue that is related to at least a threshold number of the plurality of incident records.

4. The computing system of claim 3, wherein the database device contains one or more links between: the problem record and one or more of the plurality of incident records to which the problem record is related.

5. The computing system of claim 1, wherein the plurality of information resources comprises one or more knowledge base articles that contain information related to resolution of at least some of the reported issues.

6. The computing system of claim 1, wherein the updated representation also comprises the first pane including information from the particular incident record, and wherein the second pane on the updated representation also includes the search field and the menu.

7. The computing system of claim 1, wherein storing the link comprises copying at least some information from the information resource associated with the activated control into the particular incident record.

8. The computing system of claim 1, wherein the particular incident record is a first incident record, wherein the information resource associated with the activated control is a second incident record of the plurality of incident records, and wherein the link indicates that the first incident record and the second incident record are related.

9. The computing system of claim 1, wherein the information resource associated with the activated control is a problem record that describes an issue that is related to at least a threshold number of the plurality of incident records, wherein the particular incident record includes information about the issue, and wherein the link indicates that the particular incident record and the problem record are related.

10. The computing system of claim 1, wherein the database device also contains a plurality of problem records that each respectively describe an issue that is related to at least a threshold number of the plurality of incident records, and wherein the updated representation also comprises an interface feature arranged to trigger display of information from one or more of the plurality of problem records.

11. The computing system of claim 10, wherein the one or more server devices are further configured to:

receive, by way of the interface feature and from the client device, a request to display information from a particular problem record of the plurality of problem records; and in response to receiving the request, provide, to the client device, a further updated representation of the graphical user interface that includes (i) information from the particular problem record and (ii) another control that, when activated, links the particular problem record to the particular incident record.

12. The computing system of claim 1, wherein the one or more server devices are further configured to:

provide, to the client device, an administrative representation of the graphical user interface that includes one or more of: (i) a first interface feature that enables set up of one or more of the categories, and (ii) a second interface feature that enables selection of information resources, of the plurality of information resources, permitted for inclusion in the search results.

13. The computing system of claim 1, wherein the one or more server devices are configured to:

receive, by way of the interface feature and from the client device, a request to display information from a problem record; and in response to receiving the request, provide, to the client device, a further updated representation of the graphical user interface that includes (i) information from the problem record and (ii) another control that, when activated, links the problem record to the particular incident record.

14. A method comprising:

providing, by a computing system and to a client device associated with a managed network, a representation of a graphical user interface that comprises a first pane and a second pane, wherein the computing system includes a database device disposed within a remote network management data center that manages the managed network, wherein the database device contains (i) a plurality of incident records that include information about reported issues with configuration items related to the managed network, and (ii) a plurality of information resources related to at least some of the reported issues, wherein the plurality of information resources are organized into categories, wherein the first pane includes information from a particular incident record of the plurality of incident records, and wherein the second pane includes a search field enabling entry of a description, and a menu enabling selection from the categories;

receiving, by the computing system and from the client device, (i) a keyword entered in the search field to provide the description and (ii) a selection, from the menu, of one or more of the categories;

providing, by the computing system and to the client device, an updated representation of the graphical user interface in which the second pane also includes search results that are based on the keyword and that comprise one or more information resources from one or more of the categories that were selected, wherein the one or more information resources are respectively associated, on the updated representation, with controls; and receiving, by the computing system and from the client device, input indicating activation of one of the controls, and responsively storing, in the database device, a link between the particular incident record and the information resource associated with the activated control.

15. The method of claim 14, wherein the updated representation also comprises the first pane including information from the particular incident record, and wherein the second pane on the updated representation also includes the search field and the menu.

16. The method of claim 14, wherein the first pane includes a textual explanation of a particular issue specified by the particular incident record, and wherein the search field, on the second pane of the representation, initially includes a modifiable version of the textual explanation as the description.

17. The method of claim 14, wherein storing the link comprises copying at least some information from the information resource associated with the activated control into the particular incident record.

18. The method of claim 14, wherein the particular incident record is a first incident record, wherein the information resource associated with the activated control is a second incident record of the plurality of incident records, and wherein the link indicates that the first incident record and the second incident record are related.

19. The method of claim 14, wherein the information resource associated with the activated control is a problem record that describes an issue that is related to at least a threshold number of the plurality of incident records, wherein the particular incident record includes information about the issue, and wherein the link indicates that the particular incident record and the problem record are related.

20. An article of manufacture including a non-transitory computer-readable medium, having stored thereon program instructions that, upon execution by a computing system that includes a database device disposed within a remote network management data center that manages a managed network, cause the computing system to perform operations comprising:

providing, to a client device associated with the managed network, a representation of a graphical user interface that comprises a first pane and a second pane, wherein the database device contains (i) a plurality of incident records that include information about reported issues with configuration items related to the managed network, and (ii) a plurality of information resources related to at least some of the reported issues, wherein the plurality of information resources are organized into categories, wherein the first pane includes information from a particular incident record of the plurality of incident records, and wherein the second pane includes a search field enabling entry of a description, and a menu enabling selection from the categories;

receiving, from the client device, (i) a keyword entered in the search field to provide the description and (ii) a selection, from the menu, of one or more of the categories;

providing, to the client device, an updated representation of the graphical user interface in which the second pane also includes search results that are based on the keyword and that comprise one or more information resources from one or more of the categories that were selected, wherein the one or more information resources are respectively associated, on the updated representation, with controls; and receiving, from the client device, input indicating activation of one of the controls, and responsively storing, in the database device, a link between the particular incident record and the information resource associated with the activated control.

* * * * *